UNITED STATES PATENT OFFICE.

CHARLES E. VANDERKLEED, OF COLLINGSWOOD, NEW JERSEY, ASSIGNOR TO H. K. MULFORD COMPANY, OF PHILADELPHIA, PENNSYLVANIA, A CORPORATION OF PENNSYLVANIA.

PROCESS OF PREPARING EXTRACTIVE COMPOUNDS OF THE SUPRARENAL GLAND.

1,000,214. Specification of Letters Patent. Patented Aug. 8, 1911.

No Drawing. Application filed October 9, 1909, Serial No 521,859. Renewed May 26, 1911. Serial No. 629,540.

*To all whom it may concern:*

Be it known that I, CHARLES E. VANDERKLEED, a citizen of the United States, residing in Collingswood, New Jersey, have invented certain Improvements in Processes of Preparing Extractive Compounds of the Suprarenal Gland, of which the following is a specification.

My invention relates to the production of compounds possessing the well known blood-pressure-raising, astringent and hemostatic characteristics and properties of the suprarenal glands. These compounds possess the power of markedly raising the blood-pressure of animals when injected into veins and of contracting small blood vessels when applied to them, or injected subcutaneously; and the invention comprises a process for producing such compounds in an economical and practical manner.

Among the various suprarenal gland products hitherto used in medicine is that of Otto von Fürth, which was obtained by a method involving the extraction of the fresh comminuted suprarenal glands with zinc sulfate solution, as fully described in the *Zeitschrift für Physiologische Chemie,* in vol. 26, pages 20 and 21. The expressed extraction liquors were concentrated, the coagulated albuminous material was filtered off, and the filtrate was treated with an excess of ammonia whereby a precipitate was obtained possessing the properties of the suprarenal active blood-pressure-raising and hemostatic principle, in combination or admixture with zinc hydroxid. For convenience I shall refer to this precipitate as the "intermediate product".

An object of my invention is the direct production from the said "intermediate product", without substantial loss of active material, of a salt having the properties of the active blood-pressure-raising and hemostatic principle of the suprarenal glands and in the form of a solution free from zinc or zinc salts, which solution shall be stable and available for medicinal use.

My new process consists in treating or shaking the "intermediate product" with an aqueous solution of acids which form zinc salts insoluble in water and which at the same time form water-soluble salts possessing the above noted properties of the active principle of the suprarenal glands thereby making it possible to remove the zinc by the simple process of filtration, and to obtain at once and without the use of heat or evaporation stable aqueous solutions of the desired salts in any desired degree of concentration and immediately available for medicinal use.

I have found that boric acid is best suited for the above noted purpose, since an excess of this acid may be employed without impairing the therapeutic usefulness of the resulting solution, although other acids, such for example as oxalic, citric or tartaric acid, which form zinc compounds wholly or nearly insoluble in water, may be employed.

If it is desired to prepare a solution of definite and known strength, it is necessary to first determine the degree of physiologic activity possessed by the "intermediate product". For this purpose well known physiological methods or tests, as for example, by measuring its blood-pressure-raising effect when introduced into the blood stream of animals may be employed; or the well known colorimetric methods may be employed. Having determined the physiologic activity of the "intermediate product" to be employed, an amount of the aqueous acid solution calculated to make a solution of the desired strength may be used.

It is to be understood that the use of aqueous boric or other acid solution is not intended to exclude the additional use of sodium chlorid or other salts for the purpose of producing "normal" or "isotonic" solutions; or of sulfites or other substances for the purpose of rendering the solutions more stable; or of chloroform or other substances for the purpose of rendering the solutions less suitable for the growth of bacteria or fungi.

As a specific example of my process 10 gm. of this "intermediate product" which has been shown to possess a degree of activity corresponding to 70% of that of the physiologically active principle is shaken in a bottle or flask with 3500 c. c. of water containing 10 gm. of boric acid and 30 gm. of sodium chlorid in solution, for one hour or until all soluble material has gone into solution. The insoluble zinc borate remaining undissolved, is then filtered out and the resultant product is a solution of a salt having the desired hemostatic and blood pressure raising properties in normal saline solution of the proper strength ready for immediate use. This solution may be diluted to any desired extent. Such a 70% "intermediate product" may be prepared according to the method above referred to in the following manner,—i. e. 125 pounds, for example, of fresh suprarenal glands are ground to a fine pulp and to this are added fifty liters of an aqueous 1% zinc sulfate solution. After an interval of 18 to 24 hours the mixture is pressed out and thereafter 50 liters more of 1% zinc sulfate solution are added to the previously pressed glands, which are allowed to macerate for the same length of time as before, when they are again pressed out. The united solutions are then evaporated in vacuo to a specific gravity of about 1.15. The concentrated solution is then filtered from the coagulated albuminous matter and to the filtrate is added an excess (400 c. c.) of strong ammonia water. The resulting precipitate is filtered off, washed successively with water, alcohol, and ether and dried in vacuo, thus giving the desired intermediate product.

In the preparation of the "intermediate product" stronger or somewhat weaker zinc sulfate solution than that above specified may be used, for example a 5% solution is specified by von Fürth, and it will be understood also that there may be departure from the exact quantities and relative proportions of materials and from the particular degree of concentration of the zinc sulfate solution above specified by way of example, without departing from my invention.

I claim:—

1. The process herein described for the preparation of a solution possessing the physiological activity of the suprarenal glands, which consists in acting on the precipitate obtained by treating a zinc sulfate extract of the suprarenal gland with ammonia, with a solution of an acid to form a zinc salt substantially insoluble in water and a water soluble salt having the physiological activity of the suprarenal gland; and filtering out the zinc salt thus formed.

2. The process herein described for the preparation of solutions having the physiologically active blood-pressure raising and hemostatic properties of the suprarenal glands, which consists in acting on the precipitate obtained by treating an aqueous zinc sulfate extract of the suprarenal gland with ammonia, with an aqueous solution of boric acid, and filtering out the water-insoluble zinc borate thus formed.

In testimony whereof, I have signed my name to this specification, in the presence of two subscribing witnesses.

CHARLES E. VANDERKLEED.

Witnesses:
WILLIAM E. BRADLEY,
WM. A. BARR.

---

Copies of this patent may be obtained for five cents each, by addressing the "Commissioner of Patents, Washington, D. C."